US012756933B2

(12) United States Patent
Yun et al.

(10) Patent No.: US 12,756,933 B2
(45) Date of Patent: Oct. 6, 2026

(54) ELECTRONIC DEVICE FOR PERFORMING IMAGE STABILIZATION, AND OPERATING METHOD THEREFOR

(71) Applicant: SAMSUNG ELECTRONICS CO., LTD., Suwon-si (KR)

(72) Inventors: Jaemu Yun, Suwon-si (KR); Wonseok Song, Suwon-si (KR); Songha Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 75 days.

(21) Appl. No.: 18/177,120

(22) Filed: Mar. 2, 2023

(65) Prior Publication Data

US 2023/0209202 A1 Jun. 29, 2023

Related U.S. Application Data

(63) Continuation of application No. PCT/KR2021/002873, filed on Mar. 9, 2021.

(30) Foreign Application Priority Data

Jan. 11, 2021 (KR) ........................ 10-2021-0003534

(51) Int. Cl.

*H04N 23/68* (2023.01)
*G06V 10/60* (2022.01)
*H04N 23/73* (2023.01)

(52) U.S. Cl.

CPC ........... *H04N 23/687* (2023.01); *G06V 10/60* (2022.01); *H04N 23/73* (2023.01)

(58) Field of Classification Search

CPC .. H04N 23/687; H04N 23/73; H04N 23/6812; H04N 23/683; H04N 23/685;

(Continued)

(56) References Cited

U.S. PATENT DOCUMENTS 9,232,138 B1 * 1/2016 Baldwin .............. H04N 23/682
2011/0273572 A1 * 11/2011 Tsuchida ............. G02B 27/646
348/208.4

(Continued)

FOREIGN PATENT DOCUMENTS

CN 108881703 B 7/2020
JP 2012-239644 A 12/2012

(Continued)

OTHER PUBLICATIONS

International Search Report mailed Oct. 1, 2021 for PCT/KR2021/002873.

(Continued)

*Primary Examiner* — Albert H Cutler
(74) *Attorney, Agent, or Firm* — CANTOR COLBURN LLP

(57) ABSTRACT

An electronic device includes: a motion sensor for outputting motion data corresponding to motion of the electronic device; a camera module for performing an OIS function within a operation range when the motion data has a first size; and a processor electrically connected to the motion sensor and the camera module. The processor acquires motion data from the motion sensor while continuously acquiring image frames through the camera module, determines, based on the motion data, a parameter associated with the OIS function such that the camera module performs the OIS function within the operation range using the parameter based on determination that the motion data has the second size lager than the first size, and acquire image frames for which the OIS function has been performed within the operation range using the determined parameter.

12 Claims, 10 Drawing Sheets

(58) Field of Classification Search
CPC ........ H04N 5/144; H04N 23/71; H04N 23/68; H04N 23/682; H04N 23/6842; G06V 10/60
See application file for complete search history.

(56) References Cited

U.S. PATENT DOCUMENTS

| | | | |
|---|---|---|---|
| 2014/0285677 | A1 | 9/2014 | Fujita et al. |
| 2016/0360111 | A1 | 12/2016 | Thivent et al. |
| 2017/0280059 | A1 | 9/2017 | Thivent et al. |
| 2018/0220073 | A1 | 8/2018 | Keal |
| 2019/0089906 | A1 | 3/2019 | Joo et al. |
| 2019/0260932 | A1 | 8/2019 | Jung et al. |
| 2020/0137308 | A1 | 4/2020 | Kulik et al. |
| 2020/0169665 | A1 | 5/2020 | Shin et al. |
| 2020/0267320 | A1 | 8/2020 | Song et al. |
| 2020/0314343 | A1 | 10/2020 | Urakami |
| 2020/0322534 | A1 | 10/2020 | Lee et al. |
| 2021/0360159 | A1 | 11/2021 | Shingu |

FOREIGN PATENT DOCUMENTS

| | | | |
|---|---|---|---|
| JP | 2015-201709 | A | 11/2015 |
| JP | 2019-164338 | A | 9/2019 |
| JP | 2020-109948 | A | 7/2020 |
| JP | 2020-160163 | A | 10/2020 |
| JP | 7143191 | B2 | 9/2022 |
| KR | 10-2011-0004082 | A | 1/2011 |
| KR | 10-2011-0093460 | A | 8/2011 |
| KR | 10-2013-0047343 | A | 5/2013 |
| KR | 10-2016-0087682 | A | 7/2016 |
| KR | 10-2017-0082945 | A | 7/2017 |
| KR | 10-2017-0092886 | A | 8/2017 |
| KR | 10-2019-0019504 | A | 2/2019 |
| KR | 10-2019-0032061 | A | 3/2019 |
| KR | 10-2020-0101180 | A | 8/2020 |
| KR | 10-2020-0113360 | A | 10/2020 |
| WO | 2017/119602 | A1 | 7/2017 |
| WO | 2020095623 | A1 | 5/2020 |

OTHER PUBLICATIONS

The extended European search report for EP Application No. 21917817.5 mailed on Jan. 18, 2024.
European Office Action for EP Application No. 21917817.5 mailed on Apr. 11, 2025.
Korean Office Action for KR Application No. 10-2021-0003534 mailed on Jul. 30, 2025.
Chinese Office Action for CN Application No. 202180090212.1 mailed on Apr. 15, 2026.
India Office Action for IN Application No. 202337016269 mailed on Jun. 9, 2026.

* cited by examiner

ELECTRONIC DEVICE FOR PERFORMING IMAGE STABILIZATION, AND OPERATING METHOD THEREFOR

TECHNICAL FIELD

The disclosure relates to a technology for image stabilization of an electronic device during video capture.

BACKGROUND ART

A mobile device has diversified functions, and there have been increasing demands for improved image or video capture functions using the mobile device. Consequently, there has been development of technologies for image stabilization of the mobile electronic device during video capture.

Image stabilization schemes include optical image stabilization (OIS) and video digital image stabilization (VDIS). According to the OIS, an image sensor or a lens assembly included in a camera module is used to reduce blurring, and the VDIS reduces blurring through digital processing in the mobile device.

DISCLOSURE OF INVENTION

Technical Problem

Conventional image stabilization schemes have a problem in that the OIS performance is degraded if the electronic device is shaken beyond the range of movement of the lens assembly or image sensor. The electronic device is continuously shaken during video capture, and the degree of shaking may exceed the OIS operation range. The electronic device may have difficulty in performing OIS against a predetermined level of shaking or higher, because the OIS operation range is physically limited.

Moreover, according to conventional image stabilization schemes, the electronic device cannot perform OIS with regard to at least a part of shaking of the electronic device occurring during video capture, and a defective video file may thus be generated. The electronic device may correct shaking included in the OIS operation range through OIS, but shaking beyond the OIS operation range may be difficult to correct. Therefore, the video file may have a defect in that the degree of image shaking varies with reference to a specific frame. In particular, such a defect is relatively exacerbated by a relatively large motion between the subject and the electronic device in a low-illuminance environment.

Solution to Problem

An electronic device according to an embodiment of the disclosure includes: a motion sensor configured to output motion data corresponding to motion of the electronic device; a camera module capable of performing an OIS function within an operation range when the motion data has a size within a first size; and at least one processor electrically connected to the motion sensor and the camera module. The at least one processor acquires the motion data from the motion sensor while continuously acquiring image frames through the camera module, determine, based on the motion data, a parameter associated with the OIS function such that the camera module performs the OIS function within the operation range using the determined parameter based on determination that the motion data has a second size larger than the first size, and acquire image frames for which the OIS function is performed within the operation range using the determined parameter.

A method for operating an electronic device according to an embodiment of the disclosure includes: acquiring, while continuously acquiring image frames through a camera module capable of performing an OIS function within an operation range when motion data corresponding to motion of the electronic device has a size within a first size, the motion data from a motion sensor configured to output the motion data, determining, based on the motion data, a parameter associated with the OIS function such that the camera module performs the OIS function within the operation range using the determined parameter based on determination that the motion data has a second size larger than the first size, and acquire image frames for which the OIS function is performed within the operation range using the determined parameter.

Advantageous Effects of Invention

According to various embodiments disclosed herein, an electronic device may perform OIS even if the electronic device is shaken beyond the range of movement of a lens assembly or an image sensor. Therefore, an electronic device according to the disclosure may effectively correct continuous shaking of the electronic device occurring video capture.

In addition, according to various embodiments disclosed herein, the video file quality may be effectively improved as the OIS performance is improved.

Advantageous effects obtainable from the disclosure are not limited to the above-mentioned advantageous effects, and other advantageous effects not mentioned herein will be clearly understood by those skilled in the art to which the disclosure pertains.

MODE FOR CARRYING OUT THE INVENTION

Figure 1:
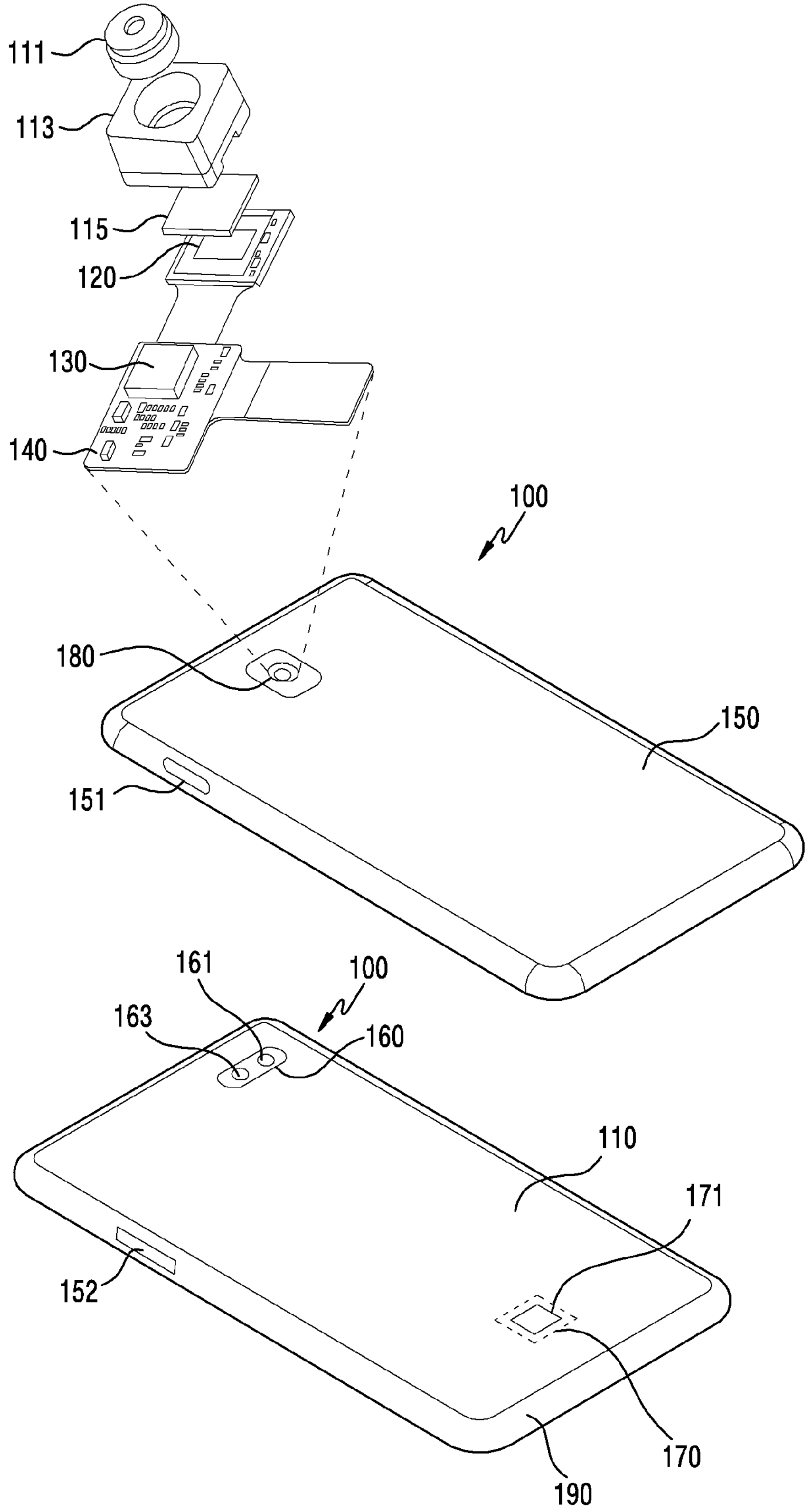
FIG. 1 illustrates structures of an electronic device and a camera module according to an embodiment.

FIG. 1 illustrates structures of an electronic device 100 and a camera module 180 according to an embodiment.

FIG. 1 schematically shows the exterior of the electronic device 100, to which the camera module 180 according to an embodiment is mounted, and the camera module 180. An embodiment of FIG. 1 has been illustrated and described on the premise of a mobile device, for example, a smartphone, but those skilled in the art will definitely understand that embodiment of FIG. 1 may be applied to an electronic device, to which a camera is mounted, among various electronic devices or mobile devices.

Referring to FIG. 1, a display 110 may be disposed on the front surface of the electronic device 100 according to an embodiment. In an embodiment, the display 110 may occupy most of the front surface of the electronic device 100. The display 110 and a bezel 190 surrounding the edge of at least a part of the display 110 may be disposed on the front surface of the electronic device 100. The display 110 may include a flat area and a curved area extending from the flat area toward the side surface of the electronic device 100. The electronic device 100 illustrated in FIG. 1 is one example, and various embodiments are possible. For example, the display 110 of the electronic device 100 may include only a flat area without a curved area, or may include a curved area at only one edge and not at both edges. Further, in an embodiment, the curved area may extend to the rear surface of the electronic device 100, and thus the electronic device 100 may include an additional flat area.

In an embodiment, the electronic device 100 may additionally include a speaker, a receiver, a front camera 161, a proximity sensor, a home key, etc. The electronic device 100 according to an embodiment may be provided with a rear cover 150 integrated with the body of the electronic device. In another embodiment, the rear cover 150 may be formed to be separated from the body of the electronic device 100 such that a battery is capable of being replaced. The rear cover 150 may be referred to as a battery cover or a rear surface cover.

In an embodiment, a fingerprint sensor 171 for recognizing a user's fingerprint may be included in a first area 170 of the display 110. The fingerprint sensor 171 may be disposed in a layer beneath the display 110, and thus may not be viewed by the user or may be difficult to view. Further, a sensor for additional user/biometric authentication, in addition to the fingerprint sensor 171, may be disposed in a partial area of the display 110. In another embodiment, the sensor for user/biometric authentication may be disposed in one area of the bezel 190. For example, an infrared (IR) sensor for iris authentication may be exposed through one area of the display 110, or may be exposed through one area of the bezel 190.

In an embodiment, the front camera 161 may be disposed in a second area 160 of the front surface of the electronic device 100. In the embodiment of FIG. 1, it has been illustrated that the front camera 161 is exposed through one area of the display 110. However, in another embodiment, the front camera 161 may be exposed through the bezel 190. In another embodiment (not shown), at least one among an audio module, a sensor module (e.g., a sensor 163), a camera module (e.g., the front camera 161), and a light-emitting element (not shown) may be disposed on the rear surface of the second area 160 of the display 110. For example, a camera module may be disposed in the front surface and/or the side surface of the electronic device 100 so as to face the front surface and/or the side surface. For example, the front camera 161 may be an under-display camera (UDC) which is not visually exposed through the second area 160.

In an embodiment, the electronic device 100 may include at least one front camera 161. For example, the electronic device 100 may include two front cameras such as a first front camera and a second front camera. In an embodiment, the first front camera and the second front camera may be an identical type of cameras having an identical specification (e.g., pixels). However, in another embodiment, the first front camera and the second front camera may be implemented as cameras having different specifications. The electronic device 100 may support functions (e.g., 3D imaging, auto focus, etc.) related to a dual camera through the two front cameras. The above description of the front camera may be identically or similarly applied to the rear camera of the electronic device 100.

In an embodiment, various types of hardware for assisting image capturing, such as a flash, or the sensor 163 may be additionally disposed in the electronic device 100. For example, the electronic device 100 may include a distance sensor (e.g., a TOF sensor) for sensing the distance between a subject and the electronic device 100. The distance sensor may be applied to all of the front camera 161 and/or the rear camera. The distance sensor may be separately disposed or may be disposed in the front camera 161 and/or the rear camera while being included therein.

In an embodiment, at least one physical key may be disposed at a side part of the electronic device 100. For example, a first function key 151 for turning on/off the display 110 or turning on/off a power source of the electronic device 100 may be disposed at a right edge with reference to the front surface of the electronic device 100. In an embodiment, a second function key 152 for controlling the volume of the electronic device 100 or controlling screen brightness, etc. may be disposed at a left edge with reference to the front surface of the electronic device 100. In addition, an additional button or key may be disposed on the front surface or the rear surface of the electronic device 100. For example, a physical button or a touch button, mapped to a specific function, may be disposed in the lower-end area of the bezel 190 of the front surface.

The electronic device 100 illustrated in FIG. 1 corresponds to one example, and the type of a device to which a technical spirit disclosed in the disclosure is applied is not limited. For example, the technical spirit of the disclosure may be applied to a foldable electronic device capable of being folded in the transverse direction or in the longitudinal direction by employing a flexible display and hinge structure, a rollable electronic device capable of being rolled, a tablet, or a notebook. Further, even when a first camera and a second camera, facing the same direction, may be disposed to face difference directions through the rotation, the folding, the deformation, etc. of a device, the present technical spirit may be applied.

Referring to FIG. 1, the electronic device 100 according to an embodiment may include the camera module 180. The camera module 180 may include a lens assembly 111, a housing 113, an infrared cut filter 115, an image sensor 120, and an image signal processor (ISP) 130.

In an embodiment, the lens assembly 111 may have lenses, the number, the arrangement, the type, etc. of which vary depending on whether the lens assembly 111 is included in at least one of the front camera 161 or the rear camera. The front camera 161 and the rear camera may have different characteristics (e.g., focal length or maximum magnification) depending on the type of the lens assembly 111. The lens may move forward and backward along an optical axis, and may operate to change a focal length such that an image of a target object which is a subject can be sharply captured.

In an embodiment, the camera module 180 may include a barrel for mounting at least one lens aligned on an optical axis, and the housing 113 for mounting at least one coil and/or magnet surrounding the circumference of the barrel with reference to the optical axis (not shown). In an embodiment, the camera module 180 may perform, using the at least one coil and/or magnet included in the housing 113, a stabilization function (e.g., optical image stabilization (OIS) function) for an image acquired by the image sensor 120. For example, the at least one coil may electromagnetically interact with each other under control of a control circuit. For example, the camera module 180 may control, under control of the processor, the direction and/or intensity of electric current passing through the at least one coil to control electromagnetic force, and may use the Lorentz force by the electromagnetic force to at least partially move (or rotate) the lens assembly 111 and a lens carrier (not shown) including the lens assembly 111 in a direction substantially perpendicular to the optical axis (not shown).

In an embodiment, the camera module 180 may use other methods in order to perform an image stabilization function. For example, the camera module 180 may use a video digital image stabilization (VDIS or DIS)) function or an electronic image stabilization (EIS) function. In an embodiment, the camera module 180 may use a method for processing a data output value from the image sensor 120 in software to correct blurring of an image. For example, the camera module 180 may extract, through the VDIS (or DIS) function which is a video digital image stabilization function, a motion vector based on the difference (different image) between two frames of a video and may increase sharpness through image processing. Further, the camera module 180 may extract a motion vector based on a video through the VDIS function to recognize, as movement, the motion of a subject itself, in addition to the movement of the electronic device 100.

In an embodiment, the infrared cut filter 115 may be disposed on the top surface of the image sensor 120. A subject image having passed through a lens may be partially filtered by the infrared cut filter 115, and then may be sensed by the image sensor 120.

In an embodiment, the image sensor 120 may be disposed on the top surface of a printed circuit board 140 (e.g., a printed circuit board (PCB), a printed board assembly (PBA), a flexible PCB (FPCB), or a rigid-flexible PCB (RFPCB)). The image sensor 120 may be electrically connected, by a connector, to the image signal processor 130 connected to the printed circuit board 140. A flexible printed circuit board (FPCB) or a cable may be used as the connector.

In an embodiment, the image sensor 120 may be a complementary metal oxide semiconductor (CMOS) sensor or a charged coupled device (CCD) sensor. Multiple individual pixels are integrated in the image sensor 120, and each pixel may include a micro lens, a color filter, and a photodiode. Each pixel, which is a type of photodetector, may convert input light to an electrical signal. Normally, the photodetector may not detect the wavelength of captured light by itself, and may not determine color information. The photodetector may include a photodiode. For example, the image sensor 120 may amplify electric current which light received through the lens assembly 111 has generated through the photoelectric effect of a light-receiving element. For example, each pixel may include a photoelectric transformation element (or a position sensitive detector (PSD)) and multiple transistors (e.g., a reset transistor, a transmission transistor, a selection transistor, and a driver transistor).

In an embodiment, subject light information incident through the lens assembly 111 may be converted to an electrical signal by the image sensor 120, and may be input into the image signal processor 130.

In an embodiment, when the image signal processor 130 and the image sensor 120 are physically separate from each other, a sensor interface based on appropriate standards may electrically connect the image sensor 120 to the image signal processor 130.

In an embodiment, the image signal processor 130 may perform image processing of an electrically converted image data. The process in the image signal processor 130 may be divided into pre-ISP (hereinafter, "pre-processing") and ISP chain (hereinafter, "post-processing"). Image processing before a demosaicing process may be pre-processing, and image processing after the demosaicing process may be post-processing. The pre-processing may include at least one of 3A processing, lens shading correction, edge enhancement, dead pixel correction, or knee correction. The 3A processing may include at least one among auto white balance (AWB), auto exposure (AE), and auto focusing (AF) processing. The post-processing may include at least one among a sensor index change, a tuning parameter change, and a screen aspect ratio adjustment. The post-processing may include processing image data output from the image sensor 120 or image data output from a scaler. The image signal processor 130 may adjust, through the post-processing, at least one among the contrast, the sharpness, the saturation, and the dithering of an image. The procedure of adjusting the contrast, the sharpness, or the saturation may be performed in a YUV color space, and the dithering procedure may be performed in a red green blue (RGB) color space. A part of the pre-processing may be performed during the post-processing, and a part of the post-processing may be performed during the pre-processing. Further, a part of the pre-processing may overlap a part of the post-processing.

In an embodiment, the camera module 180 may be disposed at the front surface of the electronic device 100 in addition to the rear surface thereof. Further, the electronic device 100 may include multiple camera modules 180 as well as one camera module 180 in order to improve the performance of a camera. For example, the electronic device 100 may further include the front camera 161 for video call or selfie-taking. The front camera 161 may support a relatively small number of pixels compared with the rear camera module. The front camera 161 may be relatively small compared with the camera module 180 of the rear camera.

Figure 2:
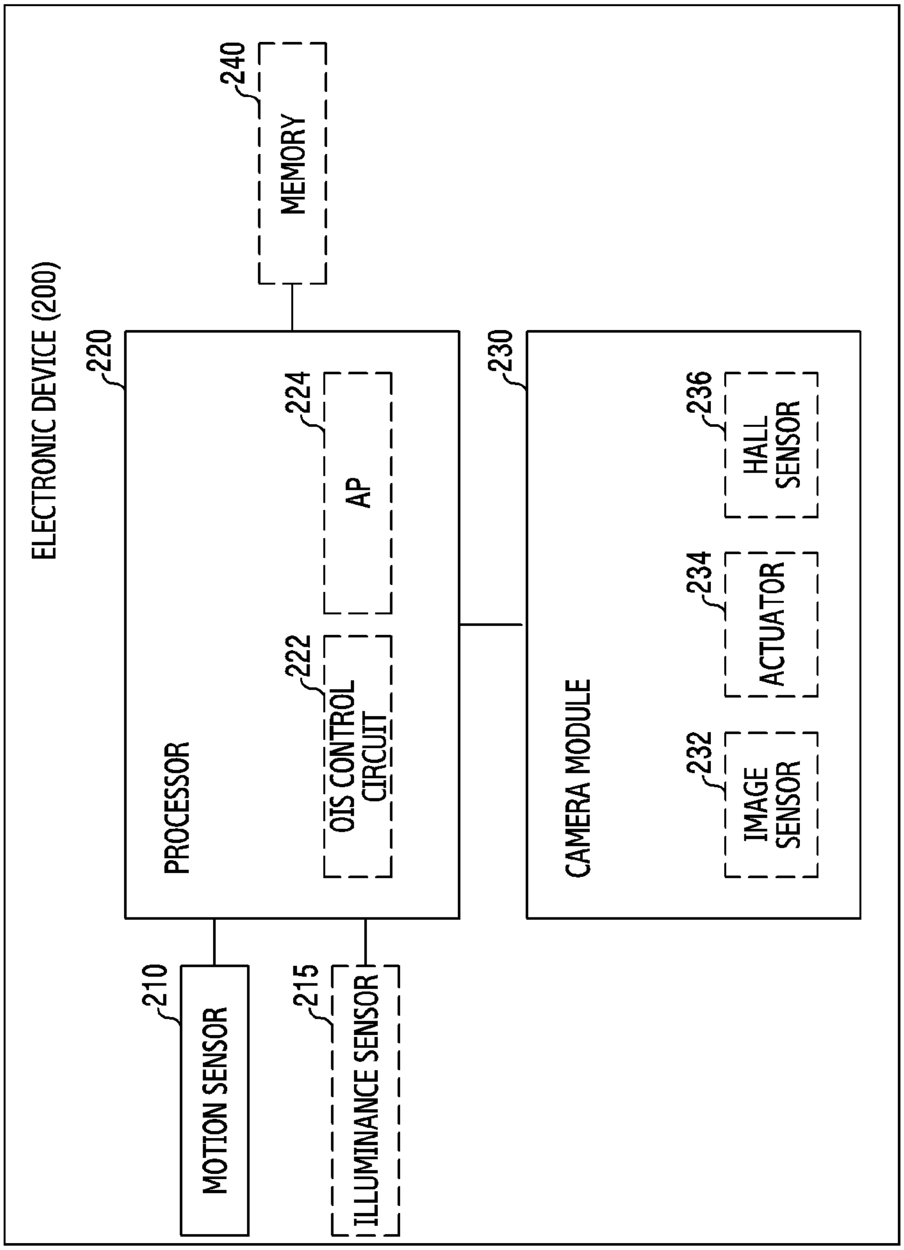
FIG. 2 is a block diagram showing hardware elements of an electronic device including a camera module according to an embodiment.

FIG. 2 is a block diagram showing hardware elements of an electronic device 200 including a camera module 230 according to an embodiment.

According to an embodiment, FIG. 2 schematically illustrates elements included in the electronic device 200, and the electronic device 200 may include elements which are identical or similar to those of the electronic device 100 illustrated in FIG. 1.

Referring to FIG. 2, the electronic device 200 may include a motion sensor 210, a processor 220, and a camera module 230. In an embodiment, the electronic device 200 may further include at least one of an illuminance sensor 215 or a memory 240. In an embodiment, the camera module 230 may include at least some of the lens assembly 111, the housing 113, the infrared cut filter 115, or the image sensor 120 among the elements included in the camera module 180 in FIG. 1.

According to an embodiment, the electronic device 200 may include the motion sensor 210. The processor 220 may sense the motion of the electronic device 200 through the motion sensor 210. The motion sensor 210 may provide the processor 220 with motion data corresponding to the motion of the electronic device 200. In an embodiment, the size of the motion data output by the motion sensor 210 may be a first size or a second size larger than the first size. The size of the motion data may mean that the distance the electronic device 200 moves or the speed of motion of the electronic device 200, and the fact that the size of the motion data is larger may mean that the distance the electronic device 200 moves is larger or that the speed of motion of the electronic device 200 is faster. For example, the first size may be a size within a range in which a motion of the electronic device 200 may be corrected through a normal OIS function (e.g., without supporting of the VDIS function), and the second size may be a size outside a range covered by the normal OIS function.

In an embodiment, the motion sensor 210 may include at least one among an acceleration sensor, a gyro sensor (a gyroscope), a magnetic sensor, or a Hall sensor. For example, the acceleration sensor may measure acceleration acting on three axes (e.g., the X-axis, the Y-axis, or the Z-axis) of the electronic device 200. In another example, the gyro sensor may measure the rotation angle or tilt of the electronic device 200 with respect to the three axes (e.g., the X-axis, the Y-axis, or the Z-axis). The sensors are merely examples, and the motion sensor 210 may further include at least one other type of sensor.

According to an embodiment, it may be understood that the processor 220 may include at least one processor. In an embodiment, the processor 220 may include at least one of an OIS control circuit 222 or an application processor (AP) 224. In an embodiment, the processor 220 may further include at least one of the image signal processor 130 or a communication processor (CP).

According to an embodiment, the OIS control circuit 222 may control the camera module 230 to perform an OIS operation. For example, the OIS control circuit 222 may control, based on the motion data acquired from the motion sensor 210, the camera module 230 to perform an OIS function. In an embodiment, the OIS control circuit 222 may be disposed adjacent to the camera module 230. For example, the OIS control circuit 222 may be disposed on one surface of the inside of the camera module 230.

According to an embodiment, the OIS control circuit 222 may acquire angle speed data from the gyro sensor. The OIS control circuit 222 may integrate the angle speed data to acquire information about an angle by which the electronic device 200 is moved. The OIS control circuit 222 may control the OIS function of the camera module 230, based on the information about the angle.

According to an embodiment, the image signal processor 130 may continuously acquire image frames while the camera module 230 performs the OIS function. The image signal processor 130 may acquire, from the camera module 230, image frames for which the OIS function has been performed, and may provide the image frames to the AP 224.

According to an embodiment, the AP 224 may acquire the image frames for which the OIS function has been performed. The AP 224 may perform a VDIS function for the image frames for which the OIS function has been performed. In another embodiment, the image signal processor 130 may provide the AP 224 with the image frames for which the VDIS function has been performed.

According to an embodiment, the camera module 230 may acquire image frames by control of the processor 220. In an embodiment, the camera module 230 may acquire image frames while the OIS function is performed by the OIS control circuit 222. In an embodiment, the camera module 230 may provide the processor 220 with the image frames acquired while performing the OIS function.

According to an embodiment, the camera module 230 may include at least one among an image sensor 232, an actuator 234, or a Hall sensor 236. In an embodiment, the image sensor 232 may correspond to the image sensor 120 illustrated in FIG. 1. In an embodiment, the camera module 230 may include the lens assembly 111 illustrated in FIG. 1.

According to an embodiment, the camera module 230 may use a lens shift method for moving the lens assembly 111 through the OIS function. For example, the processor 220 may move the lens assembly 111 by using the actuator 234. The processor 220 may sense, through the Hall sensor 236, a position to which the lens assembly 111 has been moved. According to an embodiment, the camera module 230 may use a sensor shift method for moving the image sensor 232 through the OIS function. For example, the processor 220 may move the image sensor 232 by using the actuator 234. The processor 220 may sense, through the Hall sensor 236, a position to which the image sensor 232 has been moved.

According to an embodiment, the camera module 230 may perform the OIS function within a first range (e.g., a operation range). For example, the first range may be a maximum operation range in which the camera module 230 may move the lens assembly 111 in order to compensate for the motion of the electronic device 200.

According to an embodiment, the electronic device 200 may include the illuminance sensor 215. The processor 220 may measure illuminance (or brightness) around the electronic device 200 through the illuminance sensor 215. In an embodiment, the processor 220 may determine whether the measured illuminance corresponds to a low-illuminance environment having a value smaller than a designated value. In an embodiment, the processor 220 may determine whether the measured illuminance corresponds to a high-illuminance environment having a value equal to or greater than a designated value.

According to an embodiment, the memory 240 may store various types of programming languages or instructions, which are executed by the processor 220. For example, the processor 220 may execute codes written using the programming languages stored in the memory 240 to execute applications and control various types of hardware. Further, the processor 220 may configure and support an appropriate imaging mode such that the camera module 230 may perform an operation desired by a user. In an embodiment, the processor 220 may store, in the memory 240, the image frames for which the VDIS function has been performed. In another embodiment, the processor 220 may store, in the memory 240, the image frames for which the OIS function has been performed.

Figure 3:
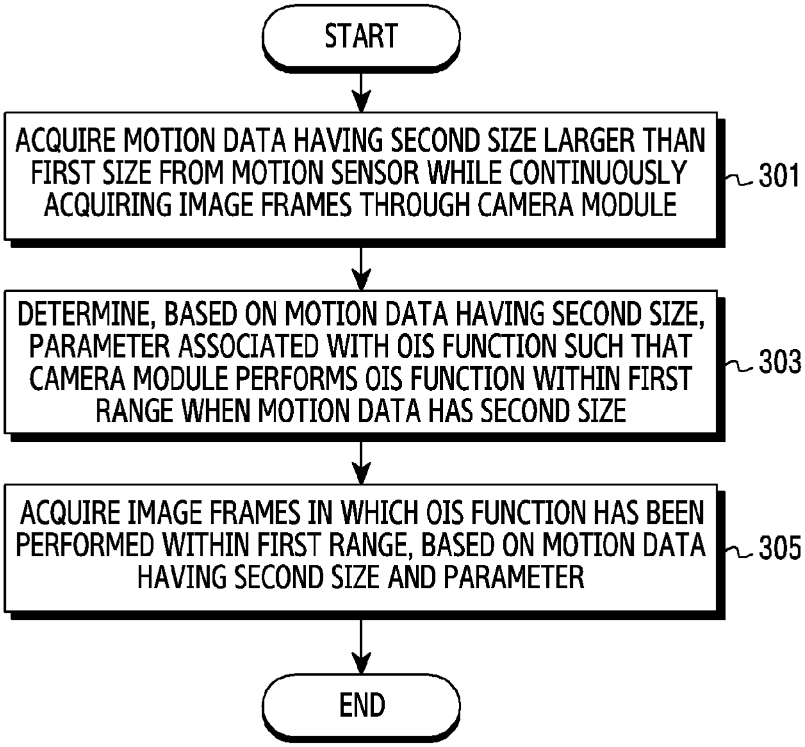
FIG. 3 is a flowchart showing an operation of an electronic device for performing an OIS function according to an embodiment.

FIG. 3 is a flowchart showing an operation of an electronic device 200 for performing an OIS function according to an embodiment. Operations described in FIG. 3 may be performed by the processor 220 or the OIS control circuit 222 illustrated in FIG. 2.

According to an embodiment, in operation 301, the processor 220 may acquire motion data having a second size larger than a first size from the motion sensor while continuously acquiring image frames through the camera module 230.

According to an embodiment, the processor 220 may drive the camera module 230, and may continuously acquire image frames through the image sensor 232. For example, the processor 220 may perform video capturing through the camera module 230, and may acquire continuous image frames included in video data.

According to an embodiment, the processor 220 may use the motion sensor 210 to acquire motion data corresponding to the motion of the electronic device 200. In an embodiment, the processor 220 may acquire motion data having the second size from the motion sensor 210.

In an embodiment, the fact that the size of motion data is larger is considered to be a fact that the range of motion of the electronic device 200 is wider. In an embodiment, the size of motion data may be expressed as the size of angle corresponding to the motion of the electronic device 200. For example, when the electronic device 200 moves (e.g., rotates) by one degree (e.g., 1°), motion data having the first size and acquired through the motion sensor 210 may be expressed as one degree. When the electronic device 200 moves (e.g., rotates) by five degrees (e.g., 5°), motion data having the second size and acquired by the motion sensor 210 may be expressed as five degrees. In another example, motion data having the first size may imply the movement of the electronic device 200 corresponding to three degrees (e.g., 3°), and the motion data having the second size may imply the movement of the electronic device 200 corresponding to 10 degrees (e.g., 10°).

According to an embodiment, in operation 303, the processor 220 may determine, based on the motion data having the second size, a parameter associated with an OIS function such that the camera module 230 performs the OIS function within a first range when the motion data has the second size.

According to an embodiment, the first range may be a maximum operation range in which the camera module 230 may perform the OIS function. In an embodiment, the first range may be the maximum angle by which the camera module 230 may move (e.g., rotate) the lens assembly 111 (or the image sensor 232) by control of the processor 220. For example, when the maximum angle by which the camera module 230 may perform the OIS function is one degree, the first range may be one degree (e.g., 1°).

According to an embodiment, when motion data has the first size, the camera module 230 may perform the OIS function within the first range. For example, motion data having the first size may be one degree, and the first range in which the camera module 230 may perform the OIS function may also be one degree. When the size of motion data is one degree, the camera module 230 may perform an OIS function within a range of one degree. According to an embodiment, when motion data has the first size, the processor 220 may not determine a parameter, or may determine a parameter to be 1.

According to an embodiment, when motion data having the second size larger than the first size is acquired, the processor 220 may determine a parameter associated with the OIS function such that the camera module 230 may perform, within the first range, the OIS function for the motion data having the second size. For example, the processor 220 may determine the parameter, based on the motion data having the second size and acquired from the motion sensor 210. According to an embodiment, when the motion data having the second size is acquired, the processor 220 may determine a parameter having a smaller value than the parameter determined when the motion data having the first size is acquired. For example, when motion data has the second size, the processor 220 may determine a parameter having a value smaller than 1.

According to an embodiment, a parameter may be considered to be a suppression ratio in which the processor 220 controls the camera module 230 to perform the OIS function. For example, when a parameter is 1, the processor 220 may control the camera module 230 to perform the OIS function within a range of one degree with respect to motion data of one degree. The case in which a parameter is 1 may be considered to be a typical (conventional) OIS function. In another example, when a parameter is 0.2, the processor 220 may control the camera module 230 to perform the OIS function within a range of one degree with respect to motion data having a size of five degrees (e.g., 5°). In an embodiment, when motion data has the second size (e.g., five degrees) larger than the first size (e.g., one degree), the processor 220 may determine the parameter such that the camera module 230 may perform the OIS function within the first range (e.g., one degree).

According to an embodiment, in operation 305, the processor 220 may acquire image frames for which the OIS function has been performed within the first range, based on the motion data having the second size and the parameter.

According to an embodiment, the processor 220 may control, based on the motion data having the second size and the parameter, the camera module 230 to perform the OIS function within the first range. The camera module 230 may acquire image frames, for which the OIS function has been performed, while performing the OIS function within the first range. The processor 220 may acquire, from the camera module 230, the image frames for which the OIS function has been performed.

According to an embodiment, the processor 220 may control the camera module 230 to perform the OIS function within the first range with respect to the motion data having the second size. For example, the processor 220 may control, based on motion data of five degrees and a parameter of 0.2, the camera module 230 to perform the OIS function within the maximum operation range of one degree with respect to the motion data of five degrees. The processor 220 may rotate the lens assembly 111 by one degree through the actuator 234 while the electronic device 200 moves by five degrees. For example, the processor 220 may control, while the electronic device 200 moves by five degrees, the camera module 230 such that the lens assembly 111 (or the image sensor 232) moves by 0.2 degrees (e.g., 0.2°) whenever the electronic device 200 moves by one degree. In an embodiment, a direction in which the electronic device 200 moves may be opposite to a direction in which the lens assembly 111 rotates.

According to an embodiment, the camera module 230 may perform the OIS function within the first range due to physical limitations. However, according to the disclosure, the processor 220 may control, when motion data acquired from the motion sensor 210 has the first size, the camera module 230 to perform the OIS function within the first range, and may also control, when the motion data has a second size larger than the first size, the camera module 230 to perform the OIS function within the first range in which the camera module 230 may perform the OIS function. Therefore, the processor 220 may correct the continuous movement of the electronic device 200, caused during video capturing. This has a remarkable effect in improving artifact of an acquired image, compared with a method in which a conventional OIS function is not performed for motion outside a range capable of being covered by the conventional OIS function. Particularly, in a low-illuminance environment, exposure time for acquiring an image at an optimum level is insufficient, and thus artifact caused by the motion of the electronic device during image capturing may be relatively significant. The artifact may be improved by applying the OIS function according to various embodiments.

According to the description made in relation to FIG. 3, the processor 220 may determine a parameter, based on the size of motion data corresponding to the motion of the electronic device 200. According to another embodiment, the processor 220 may also determine a parameter, based on the illuminance of a surrounding environment or the exposure time of the image sensor 232, together with motion data. In relation to determining the parameter in operation 303 in FIG. 3, various embodiments will be described.

According to an embodiment, the processor 220 may determine whether the motion data having the second size and acquired from the motion sensor 210 is motion data having a designated size or larger. The processor 220 may determine the parameter when the second size is equal to or larger than the designated size. In an embodiment, the designated size may be a critical size in which a lens may be controlled in order to perform an OIS function. For example, the processor 220 may not determine a parameter (or may determine a parameter to be 1) when the motion data has a size smaller than the critical size, and may determine a parameter when the motion data has a size larger than the critical size. According to an embodiment, the processor 220 may perform operations 303 and 305 when motion data having a size larger than the designated size is acquired.

According to an embodiment, the processor 220 may measure illuminance around the electronic device 200 through the illuminance sensor 215. The processor 220 may determine the parameter, based on the motion data acquired from the motion sensor 210 and the illuminance acquired through the illuminance sensor 215.

According to an embodiment, the processor 220 may determine whether the illuminance acquired through the illuminance sensor 215 corresponds to a low-illuminance environment having a value smaller than a designated value. When the electronic device 200 is in the low-illuminance environment, the processor 220 may determine the parameter. The processor 220 may control, based on the motion data having the second size and the parameter, the camera module 230 to perform an OIS function within the first range. In an embodiment, the designated value may be a critical illuminance. For example, when the electronic device 200 is in the low-illuminance environment lower than the critical illuminance, the processor 220 may perform operations 303 and 305.

According to an embodiment, the processor 220 may determine whether the illuminance acquired through the illuminance sensor 215 corresponds to a high-illuminance environment having a value equal to or greater than a designated value. When the electronic device 200 is in the high-illuminance environment, the processor 220 may control the camera module 230 to perform the OIS function within the first range with respect to the motion data having the first size. In an embodiment, the designated value may be considered to be a critical illuminance. For example, when the electronic device 200 is in the high-illuminance environment equal to or higher than the critical illuminance, the processor 220 may not perform operations 303 and 305.

According to an embodiment, the processor 220 may determine whether to determine a parameter in consideration of illuminance around the electronic device 200 together with the size of motion data. For example, when the electronic device 200 is in the low-illuminance environment, the exposure time of the image sensor 232 increases, and thus jitter or blur may be included in image frames acquired by the camera module 230. When the electronic device 200 is in the low-illuminance environment, the processor 220 may perform operations 303 and 305 in order to reduce artifacts included in the image frames. In another example, when the electronic device 200 is in the high-illuminance environment, the exposure time of the image sensor 232 decreases, and thus jitter or blur included in image frames acquired by the camera module 230 may be reduced. When the electronic device 200 is in the high-illuminance environment, the processor 220 may control the camera module 230 to perform the OIS function within the first range with respect to the motion data having a size within the first size which corresponds to at least a part of the motion data having the second size. However, in another embodiment, the processor 220 may perform the OIS function within the first range with respect to the motion data having the second size, regardless of the illuminance of the electronic device 200.

According to an embodiment, the processor 220 may determine the parameter, based on the exposure time of the image sensor 232 and the motion data having the second size. For example, the exposure time of the image sensor 232 may be determined by the illuminance around the electronic device 200 or a configuration by a user.

According to an embodiment, the processor 220 may determine the parameter, based on the magnitude of a value obtained by multiplying the exposure time and the motion data. For example, when the value obtained by multiplying the exposure time and the motion data is greater than a designated value, the processor 220 may perform operations 303 and 305. When the value obtained by multiplying the exposure time and the motion data is smaller than the designated value, the amount of artifact (e.g., jitter or blur) included in image frames is equal to or less than a predetermined level, and thus the processor 220 may not perform operations 303 and 305.

Figure 4:
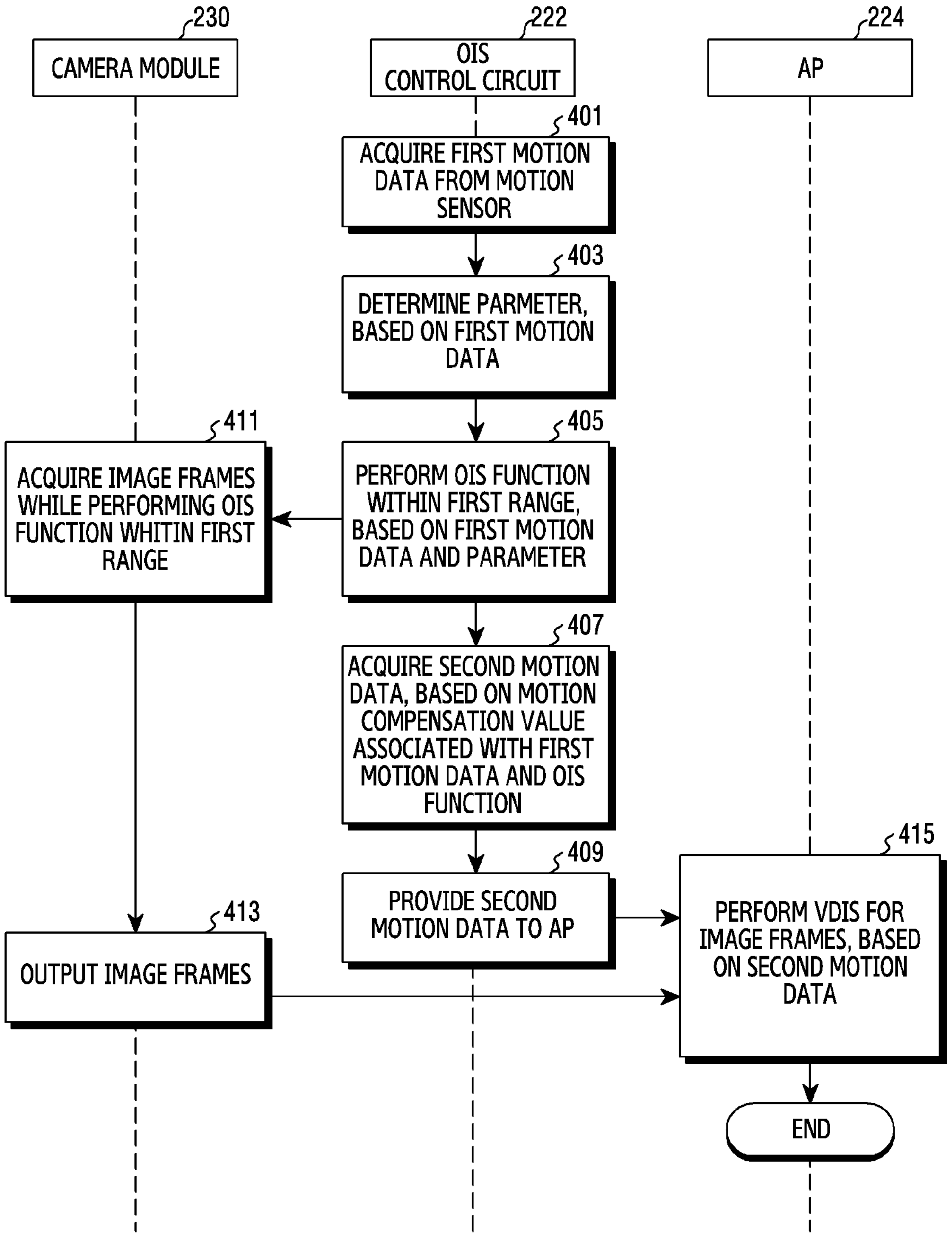
FIG. 4 is a flowchart showing an operation of an electronic device for performing an OIS function and a VDIS function according to an embodiment.

FIG. 4 is a flowchart showing an operation of an electronic device 200 for performing an OIS function and a VDIS function according to an embodiment. Operations illustrated in FIG. 4 may be performed by the camera module 230, the OIS control circuit 222, and the AP 224, illustrated in FIG. 2.

According to an embodiment, in operation 401, the OIS control circuit 222 may acquire first motion data from the motion sensor 210. In an embodiment, the first motion data may be considered to be the motion data having the second size, which the processor 220 has acquired from the motion sensor 210 in operation 301 in FIG. 3.

According to an embodiment, in operation 403, the OIS control circuit 222 may determine a parameter, based on the first motion data. In an embodiment, the parameter may be considered to be the parameter described in relation to operation 303 in FIG. 3.

According to an embodiment, in operation 405, the OIS control circuit 222 may control the camera module 230 to perform an OIS function within a first range, based on the first motion data and the parameter.

According to an embodiment, in operation 407, the OIS control circuit 222 may acquire second motion data, based on the first motion data and a motion compensation value associated with the OIS function. In an embodiment, the motion compensation value may be a motion compensation value applied to acquiring image frames by using the OIS function. When the OIS control circuit 222 has compensated for at least a part of the first motion data by performing the OIS function for the first motion data, the OIS control circuit 222 may acquire the second motion data, based on the first motion data and the compensated value. For example, when the first motion data is five degrees and when a motion compensation value, in which the OIS control circuit 222 has controlled the camera module 230 to perform the OIS function, is one degree, the OIS control circuit 222 may acquire the second motion data of four degrees (e.g., 4°).

In the embodiment in FIG. 4, for convenience in description, motion data is expressed as the size of an angle. However, the motion data may include various values, such as vector values, which imply angles or the amount of angle change for at least three axes, and a motion data acquisition time point in other embodiments. Further, the motion data may have appropriate data format usable for OIS and VDIS correction.

According to an embodiment, in operation 409, the OIS control circuit 222 may provide the second motion data to the AP 224. For example, the OIS control circuit 222 may control the camera module 230 to perform the OIS function by one degree with respect to the first motion data of five degrees, and may provide the second motion data of four degrees to the AP 224.

According to an embodiment, the OIS control circuit 222 may also provide the AP 224 with each of the first motion data and the motion compensation value. The AP 224 may acquire the second motion data, based on the first motion data and the motion compensation value, which are acquired from the OIS control circuit 222. The AP 224 may perform, based on the acquired second motion data, operation 415 described later. According to another embodiment, the OIS control circuit 222 may provide the motion compensation value to the AP 224, and the AP 224 may directly acquire the first motion data from the motion sensor 210. The AP 224 may perform operation 415 described later, based on the first motion data acquired from the motion sensor 210 and the motion compensation value acquired from the OIS control circuit 222.

According to an embodiment, in operation 411, the camera module 230 may acquire image frames while performing the OIS function within the first range. The camera module 230 may perform the OIS function within first range by control of the OIS control circuit 222. The camera module 230 may acquire image frames while performing the OIS function.

According to an embodiment, in operation 413, the camera module 230 may output the image frames.

In an embodiment, the camera module 230 may provide to the image signal processor 130 with image frames for which the OIS has been performed. In an embodiment, the image signal processor 130 may provide the AP 224 with the image frames for which the OIS function has been performed.

According to an embodiment, in operation 415, the AP 224 may perform, based on the second motion data, the VDIS function for the image frames.

According to an embodiment, the AP 224 may acquire, from the OIS control circuit 222, the second motion data acquired based on the motion compensation value applied to acquiring the image frames by using the motion data having the second size and the OIS function. According to an embodiment, the AP 224 may acquire, from the camera module 230, the image frames for which the OIS function has been performed. According to an embodiment, the AP 224 may perform VDIS function for the image frames, based on the second motion data.

According to an embodiment, the AP 224 may correct the second motion data through the VDIS function, thereby cropping at least a partial area of an image frame. For example, the AP 224 may perform the VDIS function by using a margin area other than the at least a partial area of an image frame acquired through the camera module 230. Image frames, for which the VDIS function has been performed, may be considered to be image frames from which the margin areas have been excluded.

According to an embodiment, the AP 224 may generate a video file including image frames for which the VDIS function has been performed. The AP 224 may store the video file in the memory 240.

According to an embodiment, the processor 220 may use OIS and VDIS functions to compensate the influence by the movement of the electronic device 200, made while a video is captured. In an embodiment, the processor 220 may use the OIS function to correct movement (i.e., compensate the influence by the movement) made at a level lower than a predetermine level, and may use the VDIS function to correct movement made at a level equal to or higher than the predetermined level. For example, the OIS control circuit 222 may use the OIS function to correct movement of the electronic device 200 caused by the tremble of a user's hand. Further, the AP 224 may use the VDIS function to correct movement of the electronic device 200 (i.e., compensate the remaining influence by the movement) which has not been corrected through the OIS.

According to an embodiment, the OIS control circuit 222 may control the camera module 230 to perform the OIS function for motion data having the second size larger than the first size, and thus an image frame, for which the OIS has not been performed, may not exist among the image frames transferred to the AP 224. For example, when compared with a conventional technology which cannot correct movement greater than an OIS operation range, in the image frames provided to the AP 224, an artifact by which the degree of blurring of an image varies with reference to a specific frame may be reduced. In an embodiment, the quality of a video file generated by the AP 224 may be improved as the performance of OIS performed by the OIS control circuit 222 is improved.

Figure 5:
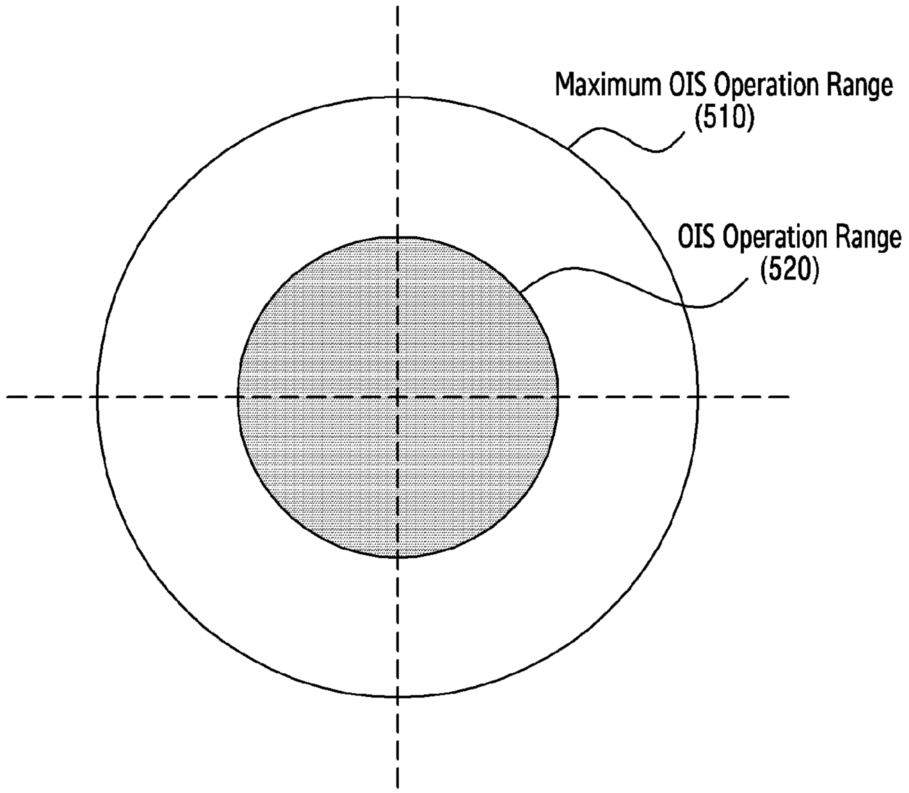
FIG. 5 illustrates an example of the range of an OIS operation which may be performed by a camera module according to an embodiment.

FIG. 5 illustrates an example of an OIS operation range 520 in which an OIS operation may be performed by the camera module 230 according to an embodiment.

According to an embodiment, the camera module 230 may perform an OIS function within a first range. In an embodiment, the processor 220 may move, within the first range, the lens assembly 111 (or the image sensor 232) included in the camera module 230. For example, the OIS control circuit 222 may rotate the lens assembly 111 within the first range by using the actuator 234. The OIS control circuit 222 may sense, through the Hall sensor 235, a position to which the lens assembly 111 has been moved.

Referring to FIG. 5, a maximum OIS operation range 510 is illustrated as an example of the maximum operation range in which the camera module 230 can perform the OIS function. The OIS operation range 520 is illustrated as an example of an operation range in which the camera module 230 can perform the OIS function. The OIS operation range 520 may be narrower than or the same as the maximum OIS operation range 510.

According to an embodiment, the maximum OIS operation range 510 may be the first range. In an embodiment, the processor 220 may perform the OIS function with respect to the OIS operation range 520 included in the maximum OIS operation range 510 due to physical limitations of the camera module 230. For example, when motion data has a first size, the camera module 230 may perform the OIS function within the maximum OIS operation range 510. When motion data has a second size, the processor 220 may determine a parameter associated with the OIS function such that the camera module 230 performs the OIS function within the maximum OIS operation range 510, and may control the camera module 230 to perform the OIS function within the maximum OIS operation range 510, based on the motion data having the second size and the parameter.

Figure 6:
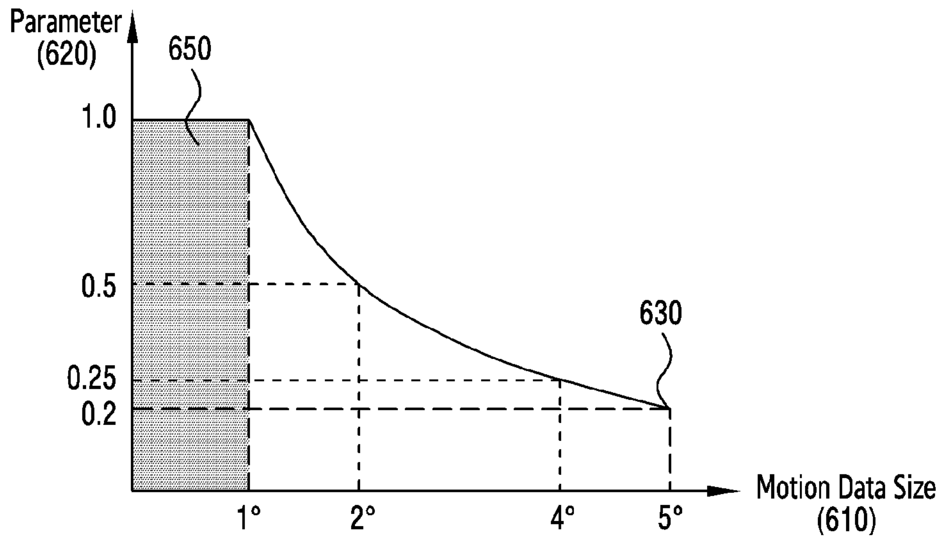
FIG. 6 illustrates an example in which an electronic device according to an embodiment determines a parameter, based on the size of motion data.

FIG. 6 illustrates an example in which the electronic device 200 according to an embodiment determines a parameter 620, based on the size of motion data 610.

According to an embodiment, the processor 220 may determine, based on the motion data 610 having a second size and acquired from the motion sensor 210, the parameter 620 associated with an OIS function such that the camera module 230 performs the OIS function for the motion data 610 having the second size within a first range. FIG. 6 illustrates an example in which the processor 220 determines the parameter 620, based on the size of the motion data 610. In an embodiment, the graph in FIG. 6 shows an example showing that the first range in which the camera module 230 may perform the OIS is one degree.

Referring to FIG. 6, motion data having a first size may be considered to be one degree. The camera module 230 may perform the OIS function within a range of one degree with respect to motion data equal to or less than one degree. For example, when the processor 220 acquires motion data of 0.5 degrees from the motion sensor 210, the processor 220 may use the actuator 234 to move (e.g., rotate) the lens assembly 111 (or the image sensor 232) by 0.5 degrees (e.g., 0.5°). According to an embodiment, when motion data having a size equal to or smaller than the first size is acquired from the motion sensor 210, the processor 220 may determine that the parameter 620 is 1.0.

Referring to FIG. 6, reference numeral 650 indicates that when the motion data acquired by the processor 220 has a size which is not larger than the first size (e.g., one degree), the camera module 230 may perform the OIS function within the first range (e.g., one degree).

Referring to FIG. 6, when the motion data 610 having the second size larger than the first size (e.g., one degree) is acquired, the processor 220 may determine a parameter 620 having a smaller value than the parameter 620 in the case in which the motion data 610 has the first size. In an embodiment, the processor 220 may determine the parameter 620 such that, with respect to the motion data 610 having the second size, multiplication of the motion data 610 and the parameter 620 corresponds to the first range (e.g., one degree) in which the OIS may be performed. For example, when the motion data 610 is two degrees (e.g., 2°), the processor 220 may determine that the parameter 620 is 0.5. In another example, when the motion data 610 is four degrees, the processor 220 may determine that the parameter 620 is 0.25. When the motion data 610 is greater than one degree, the parameter 620 may be smaller than 1.0. Mathematical Expression 1 describes a method in which the processor 220 determines the parameter 620, based on the motion data 610 acquired from the motion sensor 210.

first range=size of motion data×parameter (Under the condition of size of motion data>first size) [Mathematical Expression 1]

According to an embodiment, when the motion data 610 having the second size is two degrees, the processor 220 may determine that the parameter 620 is 0.5. In an embodiment, the processor 220 may control the camera module 230 to perform the OIS function within a range of one degree, based on the motion data 610 of two degrees and the parameter 620 of 0.5. For example, the processor 220 may control, while the electronic device 200 moves by two degrees, the camera module 230 such that the lens assembly 111 (or the image sensor 232) moves by 0.5 degrees whenever the electronic device 200 moves by one degree.

Referring to FIG. 6, in the case of reference numeral 630, the motion data 610 having the second size may be considered to be five degrees. Referring to Mathematical Expression 1, the processor 220 may determine, based on the motion data 610 of five degrees (e.g., 5°), that the parameter 620 may be determined to be 0.2. In an embodiment, the processor 220 may control the camera module 230 to perform the OIS function within a range of one degree, based on the motion data 610 of five degrees and the parameter 620 of 0.2. For example, the processor 220 may control, while the electronic device 200 moves by five degrees, the camera module 230 such that the lens assembly 111 (or the image sensor 232) moves by 0.2 degrees (e.g., 0.2°) whenever the electronic device 200 moves by one degree.

According to an embodiment, the processor 220 may not perform an OIS operation with respect to the motion data 610 greater than five degrees. For example, even with respect to the motion data 610 greater than five degrees, the processor 220 may determine that the parameter 620 is 0.2. According to another embodiment, the processor 220 may not perform the OIS operation with respect to the motion data 610 greater than 10 degrees. The processor 220 may determine the parameter of 0.1 or greater with respect to the motion data 610 equal to or less than 10 degrees, and may determine the parameter 620 of 0.1 with respect to the motion data 610 greater than 10 degrees.

According to an embodiment, even when the processor 220 has acquired the motion data 610 having a size larger than the first size (e.g., one degree, the camera module 230 may perform the OIS operation within the first range (e.g., one degree) through parameters 620 having different values depending on the size of the motion data 610.

Figure 7:
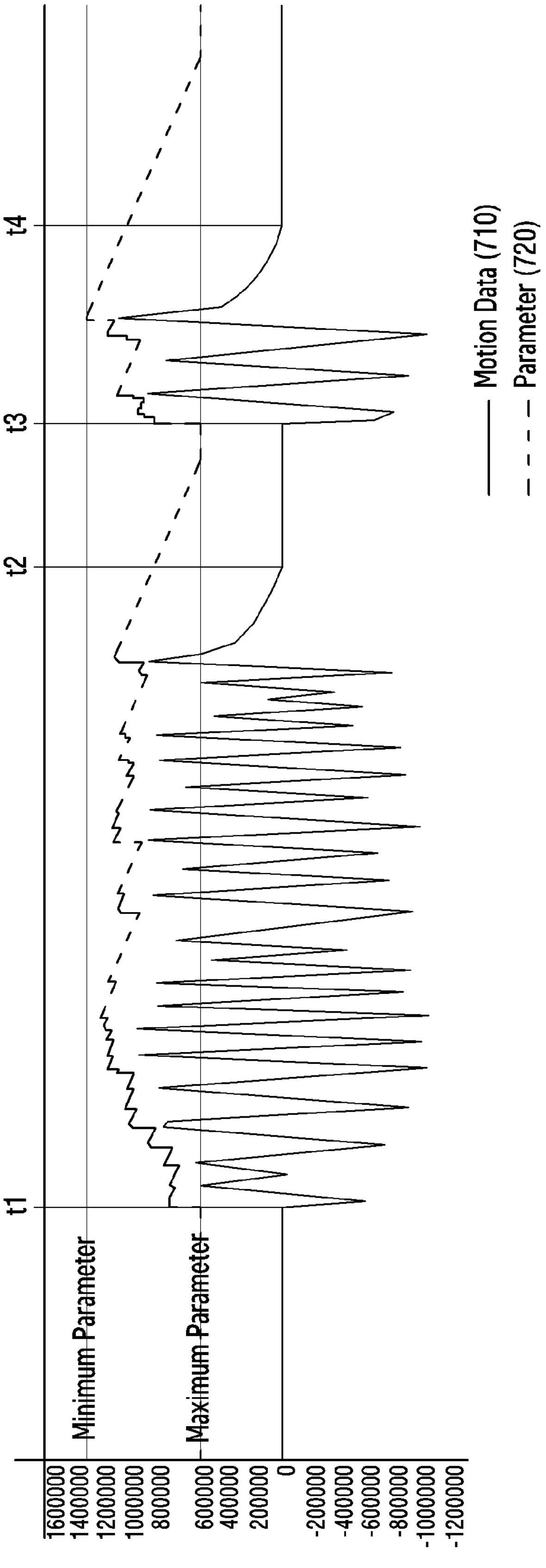
FIG. 7 illustrates an example in which an electronic device according to an embodiment determines a parameter, based on motion data.

FIG. 7 illustrates an example in which the electronic device 200 according to an embodiment determines a parameter 720, based on motion data 710.

According to an embodiment, the processor 220 may determine, based on motion data 710 acquired from the motion sensor 210, a parameter 720 associated with an OIS function. FIG. 7 illustrates an example of a parameter 720 determined based on the motion data 710.

According to an embodiment, the horizontal axis of a graph illustrated in FIG. 7 indicates time, and the vertical axis thereof indicates the size of motion data and a parameter. Referring to FIG. 7, a graph of the motion data 710 indicates an example in which the electronic device 200 has moved from time point t1 to time point t2 and from time point t3 to time point t4. In an embodiment, the processor 220 may determine, based on motion data 710 having a second size, a parameter 720 having a value between a minimum parameter and a maximum parameter.

According to an embodiment, the processor 220 may dynamically increase or decrease the size of the parameter 720 according to the size of the motion data 710. For example, before time point t1 (or between time point t2 and time point t3), the electronic device 200 is not moved, and thus the processor 220 may acquire motion data 710 having a size smaller a first size. The processor 220 may configure the parameter 720 such that a parameter 720 value before time point t1 is a maximum parameter value (e.g., 1). In another example, between time points t1 and t2 (or between time points t3 and t4), the electronic device 200 is moved, and thus the processor 220 may acquire motion data 710 having a size larger than the first size. The processor 220 may configure the parameter 720 such that a parameter 720 value between time points t2 and t3 is a value between the maximum parameter and the minimum parameter.

According to an embodiment, the processor 220 may differently determine values of the parameter 720 depending on the size of motion data 710. For example, the processor 220 may configure the parameter 720 so as to have a smaller value as the size of acquired motion data increases. According to an embodiment, the processor 220 may control the camera module 230 to perform an OIS function within a first range using a parameter 720 having a smaller value as the range in which the electronic device 200 moves is wider or as the speed at which the electronic device 200 moves increases.

According to an embodiment, the processor 220 may determine, based on the motion data 710 having the second size, a parameter 720 having a smaller value than the maximum parameter (e.g., 1), and may gradually increase the value of the parameter 720 over time. For example, after time point t4, motion data 710 is 0, but the processor 220 may gradually increase the value of the parameter 720.

According to an embodiment, while continuously acquiring motion data 710 from the motion sensor 210, the processor 220 may determine a parameter 720 value according to each piece of motion data 710. For example, when the processor 220 acquires motion data 710 of four degrees, if a parameter 720 (e.g., a gradually increasing parameter) at a corresponding time point is 0.3, the processor 220 may change the parameter 720 to 0.25. In another example, when the processor 220 acquires the motion data 710 of four degrees, if a parameter 720 at a corresponding time point is 0.1, the processor 220 may not change the parameter 720. That is, the processor 220 may change the value of a parameter 720 depending on the size of motion data 710 while gradually increasing the parameter 720.

Figure 8:
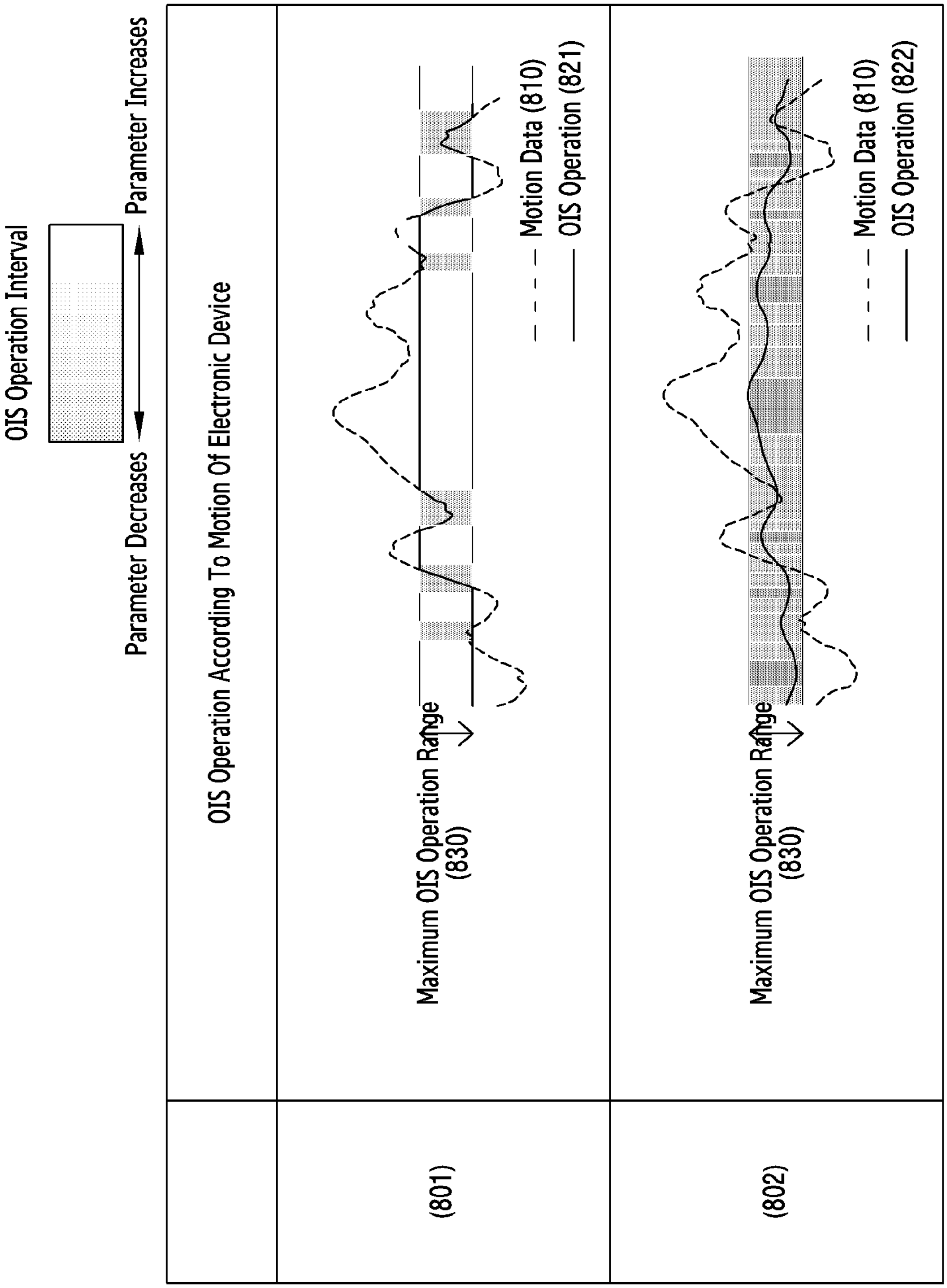
FIG. 8 illustrates an example of an OIS operation based on the motion of an electronic device according to an embodiment.

FIG. 8 illustrates an example of an OIS operation based on the motion of the electronic device 200 according to an embodiment.

Referring to FIG. 8, reference numeral 801 illustrates an example of an OIS operation 821 based on motion data 810 when an OIS function is performed according to a conventional technology. Reference numeral 802 illustrates an example of an OIS operation 822 based on motion data 810 when an OIS function is performed according to the disclosure. A maximum OIS operation range 830 may correspond to the maximum OIS operation range 510 illustrated in FIG. 5. For example, the maximum OIS operation range 830 may imply a first range in which the OIS function may be performed.

Referring to FIG. 8, in reference numeral 801, an electronic device according to a conventional technology performs the OIS operation 821 only within the maximum OIS operation range 830, regardless of the size of motion data 810. A processor according to the conventional technology performs the OIS function in an interval in which the motion data 810 is included in the maximum OIS operation range 830, but does not perform the OIS function in an interval in which the motion data 810 is greater than the maximum OIS operation range 830.

Referring to FIG. 8, in reference numeral 802, the electronic device 200 according to the disclosure may determine a parameter, based on the size of motion data 810, and may perform the OIS operation 822, based on the motion data 810 and the parameter. The processor 220 may perform an OIS function not only in an interval in which the motion data 810 is included in the maximum OIS operation range 830, but also in an interval in which the motion data 810 is greater than the maximum OIS operation range 830.

According to an embodiment, the processor 220 may decrease a parameter in response to acquiring information indicating that the size of the motion data 810 is greater than the maximum OIS operation range 830. For example, when the motion data 810 is included in the maximum OIS operation range 830, the processor 220 may determine that a parameter is 1. When the motion data 810 is outside the maximum OIS operation range 830, the processor 220 may determine that a parameter is a value smaller than 1.

According to an embodiment, the processor 220 may perform the OIS operation 822, based on the decreased parameter. For example, when the first range is one degree, when the maximum OIS operation range 830 is one degree, and when motion data 810 outside the maximum OIS operation range 830 is four degrees, the processor 220 may acquire the motion data 810 indicating that the electronic device 200 moves by four degrees. In response to acquiring the motion data 810 of four degrees, the processor 220 may determine that a parameter is 0.25. The processor 220 may control, based on the motion data 810 of four degrees and the parameter of 0.25, the camera module 230 to perform the OIS function within one degree. The processor 220 may control, while the electronic device 200 moves by four degrees, the camera module 230 such that the lens assembly 111 (or the image sensor 232) moves by 0.25 degrees (e.g., 0.25°) whenever the electronic device 200 moves by one degree.

Figure 9:
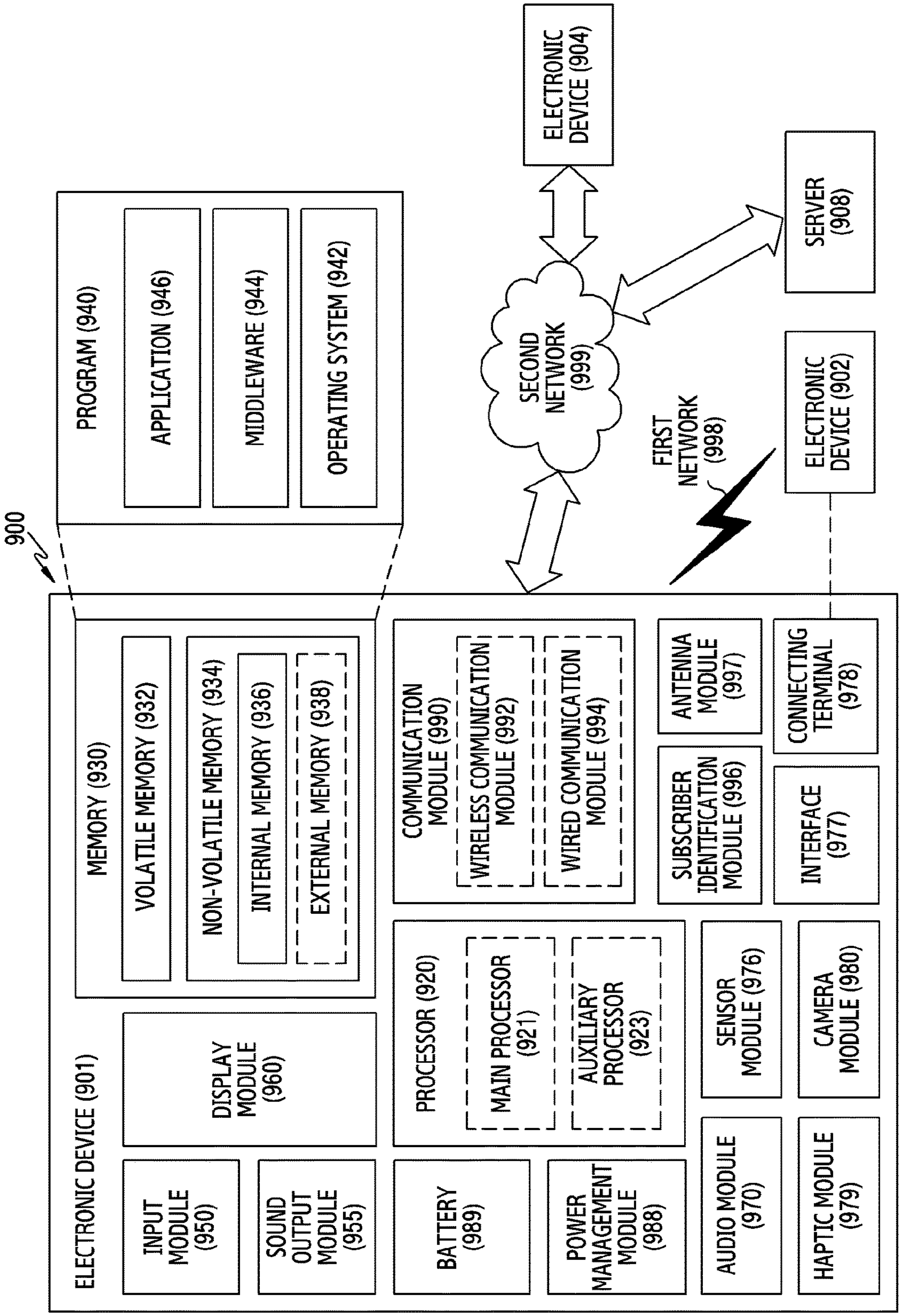
FIG. 9 is a block diagram of an electronic device in a network environment according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor

920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen).

The sound output module 955 may output sound signals to the outside of the electronic device 901. The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™ wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 10:
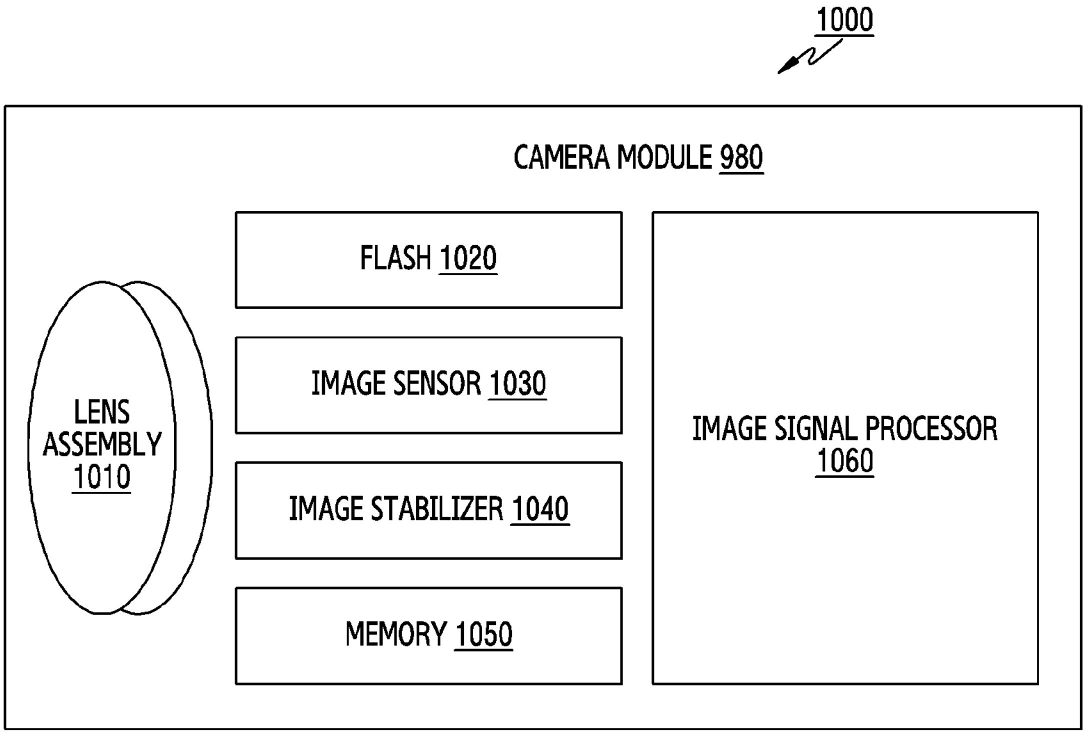
FIG. 10 is a block diagram illustrating a camera module according to various embodiments.

FIG. 10 is a block diagram 1000 illustrating the camera module 980 according to various embodiments. Referring to FIG. 10, the camera module 980 may include a lens assembly 1010, a flash 1020, an image sensor 1030, an image stabilizer 1040, memory 1050 (e.g., buffer memory), or an image signal processor 1060. The lens assembly 1010 may collect light emitted or reflected from an object whose image is to be taken. The lens assembly 1010 may include one or more lenses. According to an embodiment, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. According to an embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer. The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display module 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930.

The image signal processor 1060 may perform one or more image processing with respect to an image obtained via the image sensor 1030 or an image stored in the memory 1050. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display module 960, the electronic device 902, the electronic device 904, or the server 908) outside the camera module 980. According to an embodiment, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display module 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

An electronic device according to an embodiment herein may include: a motion sensor configured to output motion data corresponding to the motion of the electronic device; a camera module configured to perform an optical image stabilization (OIS) function within a predetermined range when the motion data has a size within a first size, and at least one processor electrically connected to the motion sensor and the camera module. The at least one processor may acquire the motion data when the motion data has a second size larger than the first size from the motion sensor while continuously acquiring image frames through the camera module, and may determine, based on the motion data having the second size, a parameter associated with the OIS function such that the camera module performs the OIS function within the predetermined range using the parameter when the motion data has the second size. The acquired image frames may be image frames for which the OIS function has been performed within the predetermined range.

In the electronic device according to an embodiment herein, the at least one processor may perform a video digital image stabilization (VDIS) function with respect to the image frames, based on the motion data having the second size and a motion compensation value applied to acquiring the image frames by using the OIS function.

In the electronic device according to an embodiment herein, the predetermined range may be a maximum operation range in which the camera module is capable of performing the OIS function.

In the electronic device according to an embodiment herein, the at least one processor may determine whether the motion data having the second size is motion data having a size equal to or larger than a designated size, and may determine the parameter when the second size is equal to or larger than the designated size.

The electronic device according to an embodiment herein may further include an illuminance sensor electrically connected to the at least one processor. The at least one processor may measure illuminance around the electronic device through the illuminance sensor, and may determine the parameter, based on the motion data having the second size and the illuminance.

In the electronic device according to an embodiment herein, the at least one processor may determine whether the illuminance corresponds to a low-illuminance environment having a value smaller than a designated value, and may determine the parameter when the electronic device is in the low-illuminance environment.

The electronic device according to an embodiment herein may further include an illuminance sensor electrically connected to the at least one processor. The at least one processor may measure illuminance around the electronic device through the illuminance sensor, may determine whether the illuminance corresponds to a high-illuminance environment having a value equal to or greater than a designated value, and may control the camera module to perform the OIS function within the predetermined range with respect to the motion data having the size within the first size when the electronic device is in the high-illuminance environment.

The electronic device according to an embodiment herein may further include a memory electrically connected to the at least one processor. The at least one processor may store, in the memory, the image frames for which the VDIS function has been performed.

A method for operating an electronic device according to an embodiment herein may include: acquiring, while continuously acquiring image frames through a camera module capable of performing an OIS function within a predetermined range when motion data corresponding to motion of the electronic device has a size within a first size, the motion data when the motion data has a second size larger than the first size from a motion sensor configured to output the motion data, and determining, based on the motion data having the second size, a parameter associated with the OIS function such that the camera module performs the OIS function within the predetermined range using the parameter when the motion data has the second size. The acquired image frames may be image frames for which the OIS function has been performed within the predetermined range.

The method for operating the electronic device according to an embodiment herein may include performing the VDIS function with respect to the image frames, based on the motion data having the second size and a motion compensation value applied to acquiring the image frames by using the OIS function.

In the method for operating the electronic device according to an embodiment herein, the determining of the parameter, based on the motion data having the second size, may include determining whether the motion data having the second size is motion data having a size equal to or larger than a designated size, and determining the parameter when the second size is equal to or larger than the designated size.

In the method for operating the electronic device according to an embodiment herein, the determining of the parameter, based on the motion data having the second size, may further include measuring illuminance around the electronic device through an illuminance sensor included in the electronic device, and determining the parameter, based on the motion data having the second size and the illuminance.

In the method for operating the electronic device according to an embodiment herein, the determining of the parameter, based on the illuminance, may further include determining whether the illuminance corresponds to a low-illuminance environment having a value smaller than a designated value, and determining the parameter when the electronic device is in the low-illuminance environment.

In the method for operating the electronic device according to an embodiment herein, the acquiring of the image frames may be performed through: measuring illuminance around the electronic device through an illuminance sensor included in the electronic device, determining whether the illuminance corresponds to a high-illuminance environment having a value equal to or greater than a designated value, and controlling the camera module to perform the OIS function within the predetermined range with respect to the motion data having the size within the first size when the electronic device is in the high-illuminance environment.

The method for operating the electronic device according to an embodiment herein may further include storing the image frames, for which the VDIS function has been performed, in a memory included in the electronic device.

An electronic device according to an embodiment herein may include a motion sensor configured to output motion data corresponding to the motion of the electronic device, a camera module configured to move a lens assembly within a predetermined range when the motion data has a first size, and at least one processor electrically connected to the motion sensor and the camera module. The at least one processor may acquire motion data having a second size larger than the first size from the motion sensor while continuously acquiring image frames through the camera module, may determine, based on the motion data having the second size, a parameter such that the camera module moves the lens assembly within the predetermined range when the motion data has the second size, and may acquire, based on the motion data having the second size and the parameter, the image frames through the moved lens assembly.

In the electronic device according to an embodiment herein, the predetermined range may be a maximum operation range in which the camera module is capable of moving the lens assembly.

In the electronic device according to an embodiment herein, the at least one processor may perform the VDIS function with respect to the image frames, based on the motion data having the second size and a range in which the lens assembly has moved.

In the electronic device according to an embodiment herein, the camera module may include an image sensor. The at least one processor may determine an exposure time of the image sensor for acquiring the image frames, and may determine the parameter, based on the exposure time and the motion data having the second size.

In the electronic device according to an embodiment herein, the at least one processor may include an OIS control circuit and an application processor (AP). The OIS control circuit may perform an OIS function of moving the lens assembly, based on the motion data and the parameter, and the AP may perform the VDIS function with respect to the image frames acquired while the camera module performs the OIS function.

The invention claimed is:

1. An electronic device comprising:

a motion sensor configured to output motion data corresponding to motion of the electronic device;

a camera module comprising an image sensor and configured to perform an optical image stabilization (OIS) function within an operation range when the motion data has a size within a first size, wherein the first size is smaller than a critical size in which a lens is controlled in order to perform an OIS function; and at least one processor electrically connected to the motion sensor and the camera module, wherein the at least one processor is configured to:

determine an exposure time of the image sensor for acquiring image frames;

acquire the motion data having a second size larger than the critical size from the motion sensor while continuously acquiring the image frames through the camera module, determine a parameter associated with the OIS function based on the exposure time and the motion data having the second size such that the camera module performs the OIS function within the operation range using the determined parameter based on determination that the motion data has the second size larger than the critical size, acquire the image frames for which the OIS function is performed within the operation range using the determined parameter, and perform a video digital image stabilization (VDIS) function with respect to the image frames, based on the motion data having the second size and a motion compensation value applied to acquiring the image frames by using the OIS function, wherein the parameter is a suppression ratio related to a degree of the OIS function with respect to the motion data having the second size larger than the critical size, the parameter is determined to decrease in response to an increase of the size of the motion data larger than the critical size, and the parameter is determined based on a magnitude of a value obtained by multiplying the exposure time and the motion data.

2. The electronic device of claim 1, further comprising an illuminance sensor electrically connected to the at least one processor, wherein the at least one processor is configured to:

measure illuminance around the electronic device through the illuminance sensor, and determine the parameter, based on the motion data having the second size and the illuminance.

3. The electronic device of claim 2, wherein the at least one processor is configured to:

determine whether the illuminance corresponds to a low-illuminance environment having a value smaller than a designated value, and determine the parameter when the electronic device is in the low-illuminance environment.

4. The electronic device of claim 1, further comprising an illuminance sensor electrically connected to the at least one processor, wherein the at least one processor is configured to:

measure illuminance around the electronic device through the illuminance sensor, determine whether the illuminance corresponds to a high-illuminance environment having a value equal to or greater than a designated value, and control the camera module to perform the OIS function within the operation range with respect to the motion data having the size within the first size when the electronic device is in the high-illuminance environment.

5. The electronic device of claim 1, further comprising a memory electrically connected to the at least one processor, wherein the at least one processor is configured to store, in the memory, the image frames for which the VDIS function is performed.

6. The electronic device of claim 1, wherein the at least one processor is configured to determine the parameter, based on a magnitude of a value obtained by dividing the operation range by the second size.

7. A method for operating an electronic device, the method comprising:

determining an exposure time of an image sensor for acquiring image frames;

acquiring, while continuously acquiring the image frames through a camera module capable of performing an OIS function within an operation range when motion data corresponding to motion of the electronic device has a size within a first size, the motion data from a motion sensor configured to output the motion data, and the first size being smaller than a critical size in which a lens is controlled in order to perform an OIS function;

determining a parameter associated with the OIS function based on the exposure time and the motion data having a second size larger than the critical size such that the camera module performs the OIS function within the operation range using the determined parameter based on determination that the motion data has the second size;

acquiring the image frames for which the OIS function is performed within the operation range using the determined parameter; and performing a video digital image stabilization (VDIS) function with respect to the image frames, based on the motion data having the second size and a motion compensation value applied to acquiring the image frames by using the OIS function, wherein the parameter is a suppression ratio related to a degree of the OIS function with respect to the motion data having the second size larger than the critical size, the parameter is determined to decrease in response to an increase of the size of the motion data larger than the critical size, and the parameter is determined based on a magnitude of a value obtained by multiplying the exposure time and the motion data.

8. The method of claim 7, wherein the determining of the parameter comprises:

measuring illuminance around the electronic device through an illuminance sensor included in the electronic device; and determining the parameter, based on the motion data having the second size and the illuminance.

9. The method of claim 8, wherein the determining of the parameter, based on the illuminance, further comprises:

determining whether the illuminance corresponds to a low-illuminance environment having a value smaller than a designated value; and determining the parameter when the electronic device is in the low-illuminance environment.

10. The method of claim 7, wherein the acquiring of the image frames is performed through:

measuring illuminance around the electronic device through an illuminance sensor included in the electronic device;

determining whether the illuminance corresponds to a high-illuminance environment having a value equal to or greater than a designated value; and controlling the camera module to perform the OIS function within the operation range with respect to the motion data having the size within the first size when the electronic device is in the high-illuminance environment.

11. The method of claim 7, further comprising storing the image frames, for which the VDIS function is performed, in a memory included in the electronic device.

12. An electronic device comprising:

a motion sensor configured to output motion data corresponding to motion of the electronic device;

a camera module comprising an image sensor and configured to move a lens assembly within an operation range when the motion data has a size within a first size, wherein the first size is smaller than a critical size in which a lens is controlled in order to perform an OIS function; and at least one processor operatively connected to the motion sensor and the camera module, wherein the at least one processor is configured to:
determine an exposure time of the image sensor for acquiring image frames,
acquire the motion data having a second size larger than the critical size from the motion sensor while continuously acquiring the image frames through the camera module,
determine a parameter associated with the OIS function based on the exposure time and the motion data having the second size such that the camera module make the lens assembly move within the operation range based on determination that the motion data has the second size larger than the critical size,
acquire the image frames through the lens assembly which is moved based on the determined parameter, and
perform a video digital image stabilization (VDIS) function with respect to the image frames, based on the motion data having the second size and a motion compensation value applied to acquiring the image frames by using the OIS function,
wherein the parameter is a suppression ratio related to a degree of the OIS function with respect to the motion data having the second size larger than the critical size,
the parameter is determined to decrease in response to an increase of the size of the motion data larger than the critical size, and
the parameter is determined based on a magnitude of a value obtained by multiplying the exposure time and the motion data.

* * * * *